United States Patent Office 2,929,849
Patented Mar. 22, 1960

2,929,849

REACTION PRODUCTS OF 2,6-BISHYDROXY-METHYL-4-PHENYLPHENOL AND ALKYL PHENOLS

Frederick J. Webb, Akron, Ohio, assignor to The Firestone Tire & Rubber Company, Akron, Ohio, a corporation of Ohio No Drawing. Continuation of application Serial No. 520,133, July 5, 1955. This application June 11, 1959, Serial No. 819,557

3 Claims. (Cl. 260—619)

This invention relates to compounds having the formula

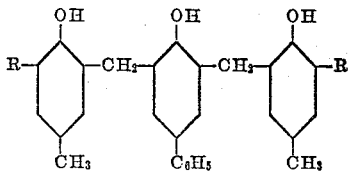

in which R is an alkyl radical of 1 to 9 carbon atoms. The end groups may be the same or different. The compounds are useful as rubber antioxidants as disclosed and claimed in my application Serial No. 520,131, filed July 5, 1955. This application is a continuation of my aplication Serial No. 520,133, filed July 5, 1955 and now abandoned.

The compounds include reaction products of 2,6-bishydroxy-methyl-4-phenylphenol and 2,4-dimethylphenol, 2-ethyl-4-methylphenol, or any 2-propyl, butyl, amyl, hexyl, heptyl, octyl or nonyl-4-methylphenol.

The invention is illustrated by the following examples. In each example, 2,6-bishydroxymethyl-4-phenylphenol was used, and this was prepared as follows:

2,6-bishydroxymethyl-4-phenylphenol

To a solution of 85 grams (0.50 mole) of 4-phenylphenol and 25 grams of sodium hydroxide in 100 ml. of water and 250 ml. of ethanol there was added 100 grams of formalin (37 percent aqueous). The reaction mixture was allowed to stand eight days at room temperature in a covered beaker and then partially evaporated at low temperature in vacuo. The yellow sodium salt which separated was filtered off, dissolved in water, and acidified with glacial acetic acid to give 74.3 grams of a white crystalline solid. This melted to a cloudy liquid at 105–110° C. after crystallization from ethyl acetate petroleum ether. For analysis, 5 grams of the product were recrystallized twice from ethyl acetate and petroleum ether, twice from acetic acid and water, and twice from ethanol and water to give a constant melting point of 111–112° C.

Analysis.—Calculated for $C_{14}H_{14}O_3$: C, 73.00; H, 6.13. Found: C, 73.09, 72.90; H, 6.11, 6.06.

This recrystallized 2,6-bishydroxymethyl-4-phenylphenol was used in each of the following examples:

Example 1.—Reaction products of bishydroxymethyl-4-phenylphenol and tt-octyl-4-methylphenol A mixture of 13.2 grams (0.06 mole) of 2-tt-octyl-4-methylphenol and 6.9 grams (0.03 mole) of bishydroxymethyl-4-phenylphenol in 25 ml. of glacial acetic acid was saturated with dry hydrogen chloride and allowed to stand at room temperature for 13 days. Filtration of the reaction mixture gave 8.1 grams of a white crystalline solid melting at 150° C. after softening from 120° C.

The crystalline product was ground under petroleum ether and on filtration yielded 7.6 grams. Recrystallization from ethyl acetate and petroleum ether gave 1.7 grams of crystals melting at 145–148° C. and 2.5 grams of crystals from the filtrate melting at 150–152° C. (Cloudy.) The latter portion on recrystallization melted at 155–160° C.; weight: 2.0 grams. This product has the foregoing general formula.

Example 2.—Reaction product of bishydroxymethyl-4-phenylphenol and 2-t-butyl-4-cresol A mixture of 13.1 grams (0.08 mole) of 2-t-butyl-4-methylphenol and 9.2 grams (0.04 mole) of bishydroxymethyl-4-phenylphenol were dissolved in 30 ml. of warm glacial acetic acid. The solution was cooled somewhat and saturated with dry hydrogen chloride. After 8 days at room temperature, the reaction mixture was poured into 1500 ml. of water. The product separated as a white solid which was filtered off, washed free of acid with water, and dried in vacuo; weight: 20.0 grams. In a capillary tube the product softened at 80–90° C. and melted to a cloudy liquid at 118–120° C.

The foregoing examples are illustrative. The invention is covered in the claims which follow.

What I claim is:
1. Compounds having the formula

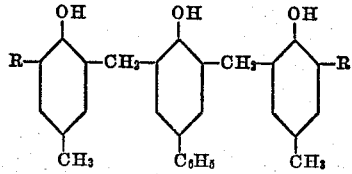

in which R is an alkyl radical of 1 to 9 carbon atoms.
2. The compound of claim 1 in which each R is a tt-octyl group.
3. The compound of claim 1 in which each R is a t-butyl group.

References Cited in the file of this patent
UNITED STATES PATENTS

| | | |
|---|---|---|
| 2,538,355 | Davis et al. | Jan. 16, 1951 |
| 2,598,234 | De Groote et al. | May 27, 1952 |
| 2,628,212 | Young | Feb. 10, 1953 |
| 2,647,102 | Ambelang | July 28, 1953 |